(12) United States Patent  (10) Patent No.: US 7,332,238 B2
Motupally et al.  (45) Date of Patent: Feb. 19, 2008

(54) ELECTROCHEMICAL CELLS AND SYSTEMS

(75) Inventors: Sathya Motupally, Stamford, CT (US); Jonathan O'Neill, Washington, DC (US)

(73) Assignee: The Gillette Company, Boston, MA (US)

( * ) Notice: Subject to any disclaimer, the term of this patent is extended or adjusted under 35 U.S.C. 154(b) by 704 days.

(21) Appl. No.: 10/236,126

(22) Filed: Sep. 6, 2002

(65) Prior Publication Data

US 2004/0048121 A1 Mar. 11, 2004

(51) Int. Cl.
*H01M 8/04* (2006.01)
*H01M 12/06* (2006.01)

(52) U.S. Cl. .............................. 429/27; 429/34; 429/25
(58) Field of Classification Search ................. 429/27, 429/7, 13
See application file for complete search history.

(56) References Cited

U.S. PATENT DOCUMENTS

| | | | |
|---|---|---|---|
| 1,221,196 A | 4/1917 | Lewis | |
| 2,233,593 A | 3/1941 | Eddy et al. | |
| 2,468,430 A | 4/1949 | Derksen | |
| 2,572,918 A | 10/1951 | Fisher et al. | |
| 2,909,586 A | 10/1959 | Hagspihl | |
| 3,378,406 A | 4/1968 | Rosansky | |
| 3,385,780 A | 5/1968 | Feng | |
| 3,423,246 A | 1/1969 | Prager et al. | |
| 3,423,247 A | 1/1969 | Darland, Jr. et al. | |
| 3,457,115 A | 7/1969 | Kent | |
| 3,479,225 A | 11/1969 | Chodosh et al. | |
| 3,513,030 A | 5/1970 | Rosansky et al. | |
| 3,518,123 A | 6/1970 | Katsoulis et al. | |
| 3,531,327 A | 9/1970 | Moos | |
| 3,553,024 A | 1/1971 | Fishman | |
| 3,595,700 A | 7/1971 | Rosansky | |
| 3,600,233 A | 8/1971 | Coffey et al. | |
| 3,630,785 A | 12/1971 | Whitestone et al. | |
| 3,648,337 A | 3/1972 | Greskamp et al. | |
| 3,682,706 A | 8/1972 | Yardney et al. | |
| 3,759,748 A | 9/1973 | Palmer | |
| 3,775,189 A | 11/1973 | Jaggard | |
| 3,960,600 A | 6/1976 | Chodosh | |
| 3,963,519 A | 6/1976 | Louie | |
| 3,977,901 A | 8/1976 | Buzzelli | |
| 4,054,725 A | 10/1977 | Tuburaya | |
| 4,112,198 A | 9/1978 | Przybyla et al. | |
| 4,152,489 A | 5/1979 | Chottiner | |

(Continued)

FOREIGN PATENT DOCUMENTS

EP 0 120 548 A2 10/1984

(Continued)

OTHER PUBLICATIONS

Appleby et al., "The C.G.E. Circulating Zinc/Air Battery: A Practical Vehicle Power Source", *Journal of Power Sources* 1:17-34 (1976/77).

(Continued)

*Primary Examiner*—John S. Maples
(74) *Attorney, Agent, or Firm*—Fish & Richardson P.C.

(57) ABSTRACT

An electrochemical cell or cell system includes an air mover, such as a fan, and one or more pressure-sensitive mechanisms, such as a slit valve, that allow air to enter or to exit the cell or system.

21 Claims, 15 Drawing Sheets

U.S. PATENT DOCUMENTS

| | | | |
|---|---|---|---|
| 4,254,192 A | 3/1981 | Bernstein et al. | |
| 4,354,958 A | 10/1982 | Solomon | |
| 4,369,568 A | 1/1983 | Dopp | |
| 4,440,835 A | 4/1984 | Vignaud | |
| 4,444,852 A | 4/1984 | Liu et al. | |
| 4,450,211 A | 5/1984 | Vignaud | |
| 4,877,694 A | 10/1989 | Solomon et al. | |
| 4,965,148 A | 10/1990 | Daio et al. | |
| 5,154,993 A | 10/1992 | Beatty | |
| 5,208,526 A | 5/1993 | Goldman et al. | |
| 5,258,239 A * | 11/1993 | Kobayashi | 429/27 |
| 5,306,579 A | 4/1994 | Shepard, Jr. et al. | |
| 5,318,862 A | 6/1994 | Liu et al. | |
| 5,328,777 A | 7/1994 | Bentz et al. | |
| 5,364,712 A | 11/1994 | Townsend | |
| 5,480,735 A | 1/1996 | Landsman et al. | |
| 5,508,131 A | 4/1996 | Bowen et al. | |
| 5,518,834 A | 5/1996 | Yoshizawa et al. | |
| 5,554,918 A | 9/1996 | Harats et al. | |
| 5,560,999 A | 10/1996 | Pedicni et al. | |
| 5,691,074 A | 11/1997 | Pedicini | |
| 5,718,985 A | 2/1998 | Bunyea et al. | |
| 5,721,064 A | 2/1998 | Pedicini et al. | |
| 5,803,121 A | 9/1998 | Estes | |
| 5,837,394 A | 11/1998 | Schumm, Jr. | |
| 6,017,653 A | 1/2000 | Petrakovich et al. | |
| 6,106,962 A | 8/2000 | Pedicini et al. | |
| 6,127,061 A | 10/2000 | Shun et al. | |
| 6,197,445 B1 | 3/2001 | Ward et al. | |
| 6,203,940 B1 | 3/2001 | Oltman et al. | |
| 6,210,826 B1 | 4/2001 | Dopp et al. | |
| 6,210,827 B1 | 4/2001 | Dopp et al. | |
| 6,232,007 B1 | 5/2001 | Payne et al. | |
| 6,242,121 B1 | 6/2001 | Pedicini et al. | |
| 6,274,261 B1 | 8/2001 | Tinker et al. | |
| 6,296,961 B1 | 10/2001 | Moy et al. | |
| 6,342,314 B1 | 1/2002 | Sieminski et al. | |
| 6,350,537 B1 | 2/2002 | Pedicini | |
| 6,361,294 B1 * | 3/2002 | Witzigreuter et al. | 417/413.3 |
| 6,365,296 B1 | 4/2002 | Young | |
| 6,368,738 B1 | 4/2002 | Passaniti et al. | |
| 6,416,896 B1 | 7/2002 | Tamaru et al. | |
| 6,935,609 B2 * | 8/2005 | Sherman et al. | 251/76 |

FOREIGN PATENT DOCUMENTS

| | | |
|---|---|---|
| EP | 0 555 978 B1 | 4/1997 |
| EP | 0 978 890 A1 | 2/2000 |
| GB | 1 262 771 | 2/1972 |
| WO | WO 00/36696 | 6/2000 |
| WO | WO 00/36697 | 6/2000 |
| WO | WO 01/97317 A1 | 12/2001 |
| WO | WO 01/97318 A1 | 12/2001 |
| WO | WO 01/97319 A1 | 12/2001 |
| WO | WO 02/31906 A1 | 4/2002 |
| WO | WO 02/061859 | 8/2002 |

OTHER PUBLICATIONS

Chakkaravarthy et al., "Zinc-Air Alkaline Batteries—A Review", *Journal of Power Sources* 6:203-228 (1981).

Chodosh et al., "Zinc-Air Battery Systems", *Power Sources 2, Research and Development In Non-Mechanical Electrical Power Sources* 423-440 (1968).

* cited by examiner

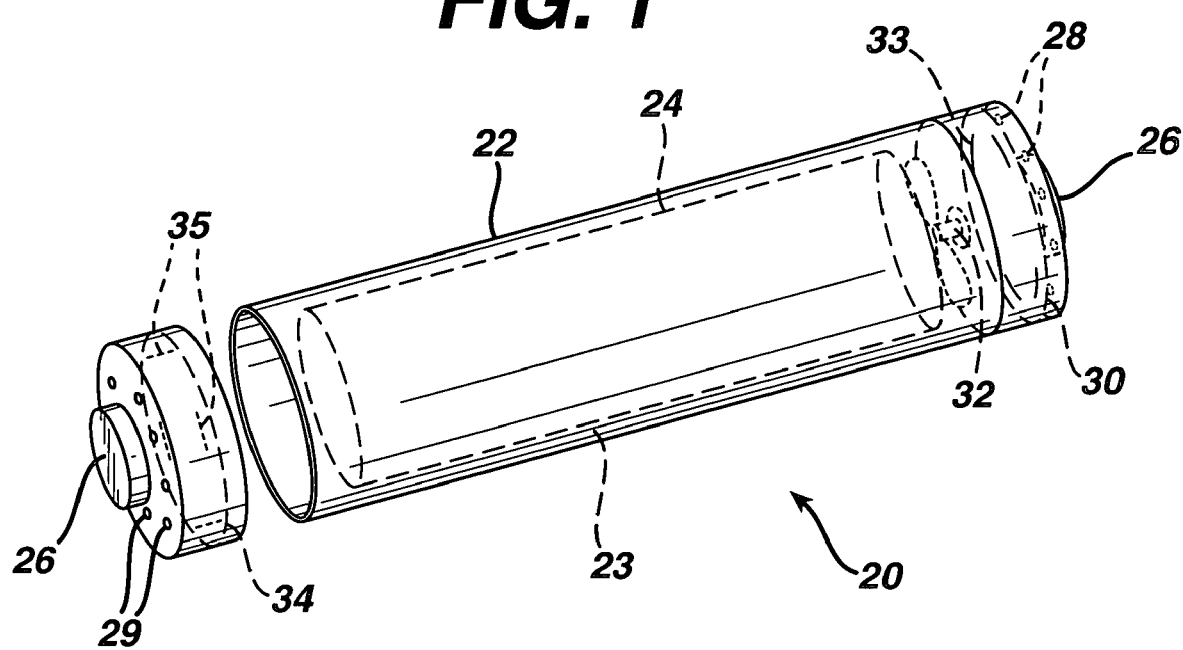

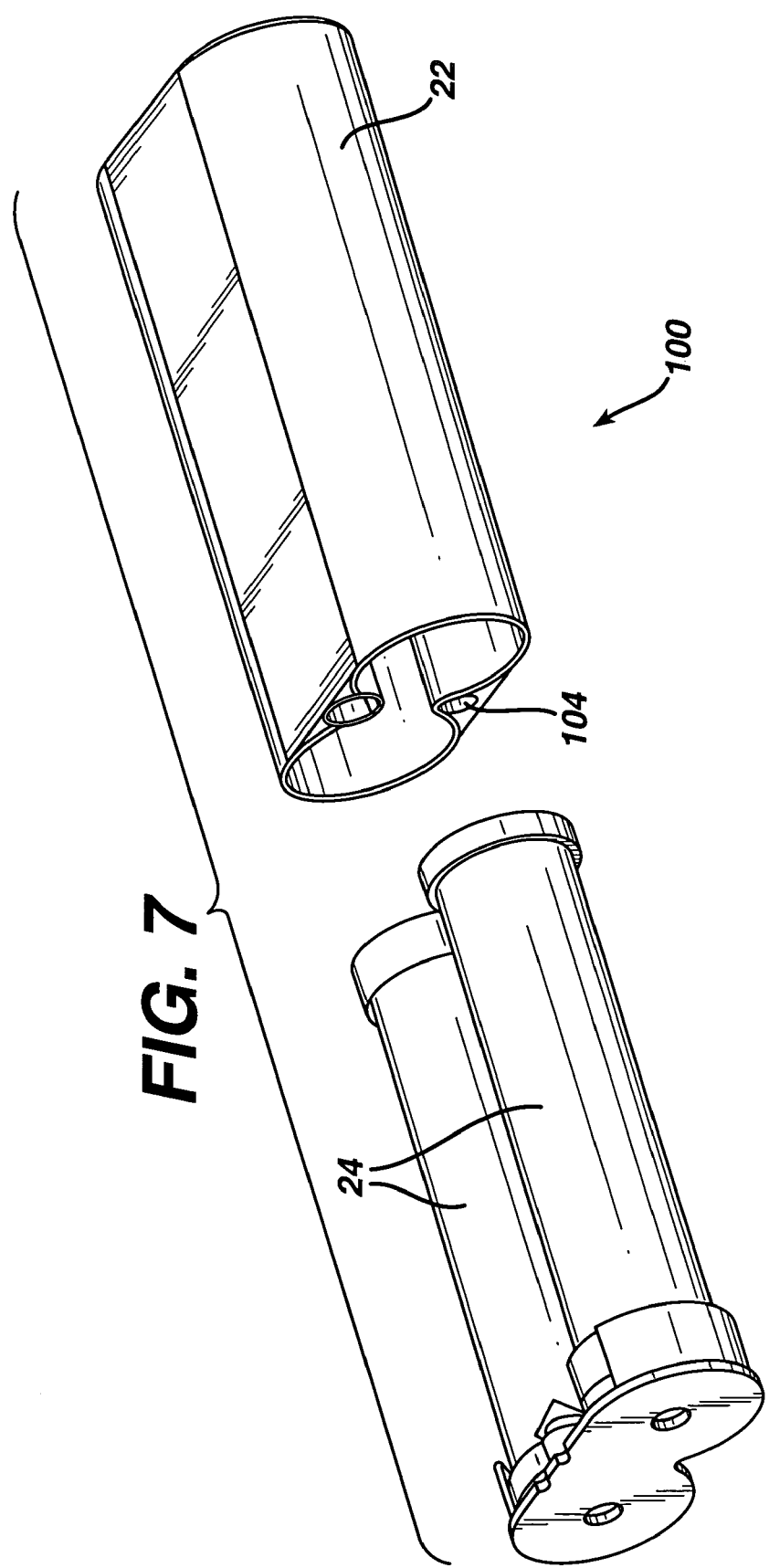

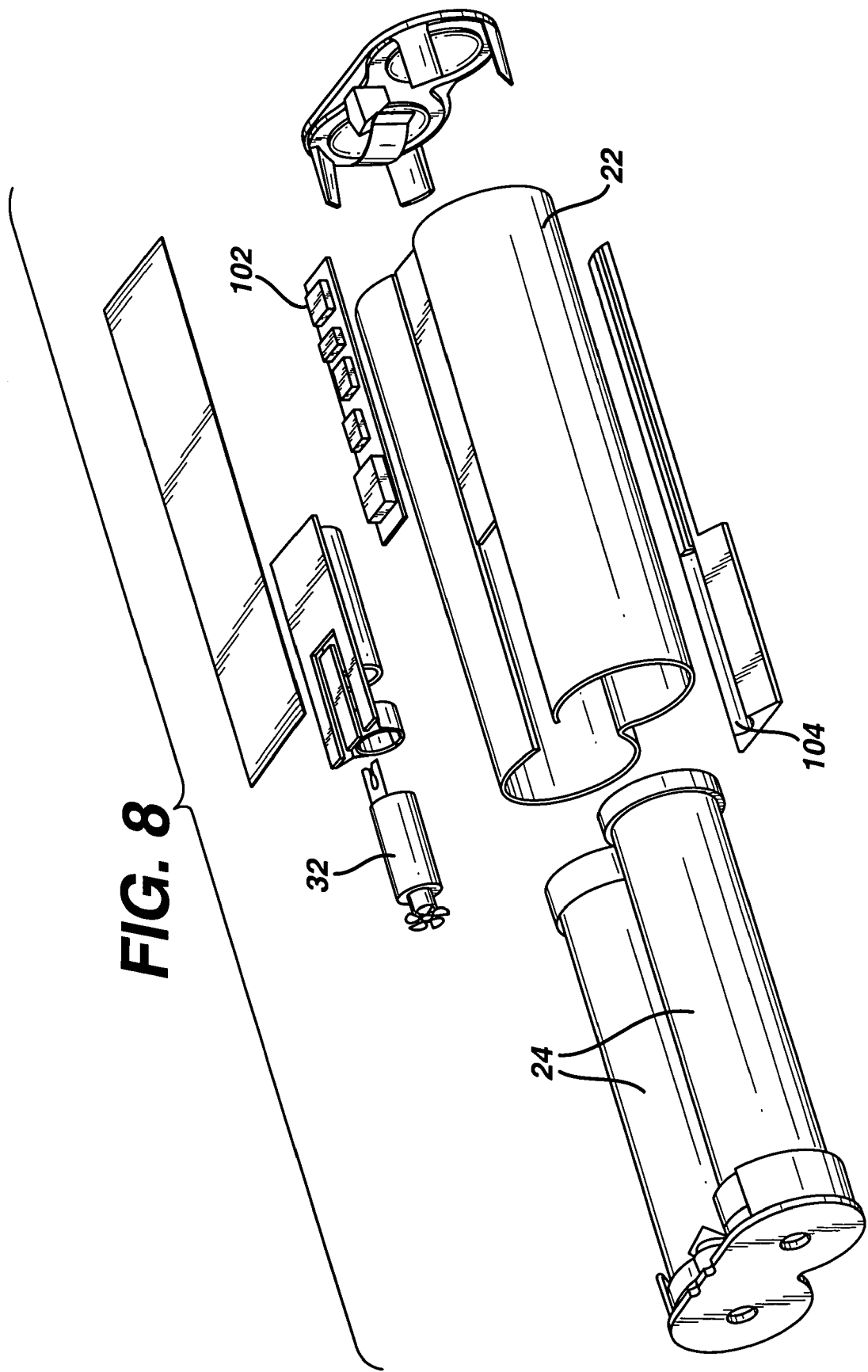

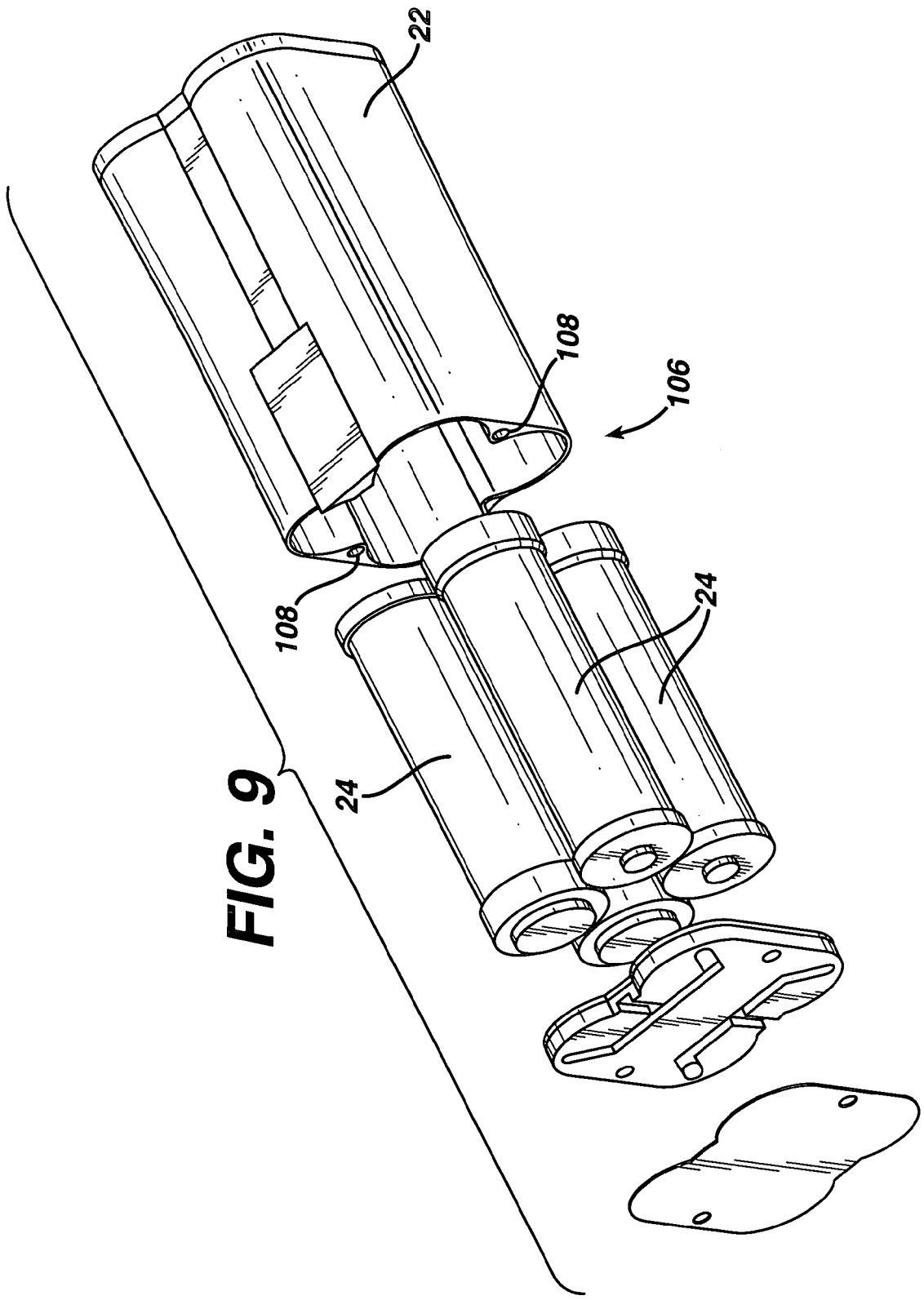

ELECTROCHEMICAL CELLS AND SYSTEMS

TECHNICAL FIELD

The invention relates to electrochemical cell systems.

BACKGROUND

Electrochemical cells are commonly used electrical power sources. A cell contains a negative electrode and a positive electrode. The negative electrode contains an active material that can be oxidized; the positive electrode contains or consumes an active material that can be reduced. The negative electrode active material is capable of reducing the positive electrode active material. In some embodiments, to prevent direct reaction of the positive electrode material and the negative electrode material, the negative electrode and the positive electrode are electrically isolated from each other by a separator.

When a cell is used as an electrical energy source in a device, electrical contact is made to the electrodes, allowing electrons to flow through the device and permitting the respective oxidation and reduction reactions to occur to provide electrical power. An electrolyte, for example, potassium hydroxide, in contact with the electrodes contains ions that flow through the separator between the electrodes to maintain charge balance throughout the cell during discharge.

In a metal-air electrochemical cell, oxygen is reduced at the positive electrode (the cathode), and a metal is oxidized at the negative electrode (the anode). Oxygen can be supplied to the cathode from the atmospheric air external to the cell through one or more air hole(s) in the cell can.

To prolong cell life, it is desirable that the cathode be isolated from air flow when not in use (e.g., to reduce carbonation), but exposed to air flow when in use. During use, it is desirable to provide uniform and sufficient air access to the cathode to provide, for example, uniform discharge of the active materials and/or a relatively high discharge voltage profile.

SUMMARY

The invention relates to electrochemical cell systems, such as, for example, those having metal-air cell(s). When used in an electronic device, the systems provide good air management according to the power requirements of the device. Generally, the system exposes cell(s) in the system to air when the device is on, and limits air flow to the cell(s) when the device is off, thereby prolonging the life of the cell(s). In embodiments, to regulate air flow, the systems include an air mover and a mechanism, such as a valve, that is sensitive to a pressure differential.

In one aspect, the invention features an electrochemical cell system including a housing, a metal-air cell in the housing, an air mover in fluid communication with the metal-air cell, and a pressure-sensitive valve in fluid communication with and responsive to the air mover. The valve and air mover are capable of regulating air flow to the metal-air cell.

Embodiments may include one or more of the following features. The system includes a plurality of pressure-sensitive valves. The housing includes an opening. The housing includes a second pressure-sensitive valve extending across the opening. The system further includes an elongate, hollow structure extending along the housing, the structure defining a channel in fluid communication with the metal-air cell. The system further includes a second pressure-sensitive valve extending across an opening defined by the structure. The air mover, e.g., a fan, is in the housing. The system further includes a plurality of metal-air cells in the housing. The cell can include a material having a gas permeability across a first portion of the material that is different than gas permeability across a second portion of the material. The housing can be cylindrical or prismatic.

The valve can include a stationary portion and a movable portion responsive to the air mover, the movable portion capable of moving relative to the stationary portion to define a variable gap between the portions. The valve can include two movable portions responsive to the air mover and capable of defining a variable gap between the portions. The valve can include a movable portion capable of moving in a first direction and a second direction opposite to the first direction. The valve can include a movable portion capable of moving in only one direction. The valve can be impermeable to water and/or carbon dioxide. The valve can include a polymer and/or a metal.

The air mover can be upstream and/or downstream of the valve along an air flow path into the housing.

In another aspect, the invention features a metal-air cell including a cathode, an air mover in fluid communication with the cathode, and a pressure-sensitive valve in fluid communication with and responsive to the air mover, the valve and the air mover capable of regulating air flow to the cathode.

Embodiments may include one or more of the following features. The cell includes a plurality of pressure-sensitive valves. The air mover, e.g., a fan, can be upstream and/or downstream of the valve along an air flow path into the housing. The cell further includes a housing, wherein the cathode, the air mover, and the valve are in the housing.

The valve can include a stationary portion and a movable portion responsive to the air mover, the movable portion capable of moving relative to the stationary portion to define a variable gap between the portions. The valve can include two movable portions responsive to the air mover and capable of defining a variable gap between the portions. The valve can include a movable portion capable of moving in only one direction. The valve can be impermeable to water and/or carbon dioxide. The valve can include a polymer and/or a metal.

In another aspect, the invention features a method of regulating air flow to a metal-air cell including activating an air mover in fluid communication with the metal-air cell, and opening a pressure-sensitive valve in response to a force created by the air mover to regulate air flow to the cell.

Embodiments may include one or more of the following features. The air mover is activated in response to a current demand. The method further includes de-activating the air mover to move the valve to a closed position. The method further includes de-activating the air mover to move the valve to a rest position. The method further includes flowing air through an elongate channel in fluid communication with the metal-air cell.

Opening the valve can include deflecting a movable portion relative to a stationary portion of the valve and/or deflecting two movable portions to define a gap between the portions.

Embodiments may have one or more of the following advantages. The mechanisms for regulating air flow are relatively compact. As a result, more active materials can be placed in the system, thereby increasing the capacity of the system. The system provides a simple and functional system for managing air flow to a metal-air battery. The system can be formed in a variety of shapes to suit different devices, and the system can be produced at relatively low cost. Operation of the system is simple. In some embodiments, operation of the system is transparent to the user.

Other aspects, features, and advantages of the invention will be apparent from the description of the preferred embodiments thereof and from the claims.

DESCRIPTION OF DRAWINGS

FIG. 1 is an illustration of an embodiment of an electrochemical cell system.

FIG. 7 is a perspective view an embodiment of an electrochemical cell system.

FIG. 8 is an exploded view of the electrochemical cell system of FIG. 7.

FIG. 9 is a perspective view an embodiment of an electrochemical cell system.

DETAILED DESCRIPTION

Figure 2A:
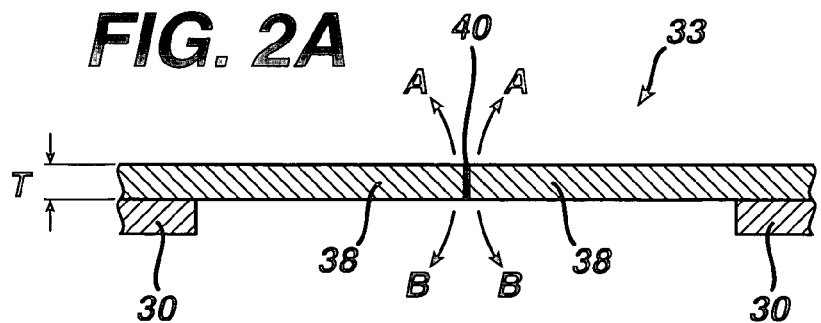
FIGS. 2A and 2B are illustrations of an embodiment of a slit valve in a closed position and an open position, respectively.

Referring to FIG. 1, an electrochemical cell system 20 includes a housing 22 having air access openings 28 and 29, and an electrochemical cell 24, here, a metal-air cell, configured to be placed inside the housing. Housing 22 and cell 24 define a plenum 23 around the cell. System 20 is generally dimensioned to fit into a battery compartment of an electronic device, such as a telecommunication device. For example, housing 22 can be dimensioned similar to one or more conventional batteries, e.g., AA batteries, and system 20 includes terminals 26 that are configured to contact corresponding terminals of the electronic device.

System 20 is generally designed to provide cell 24 with uniform and sufficient air flow during use. When not in use, system 20 reduces or stops exposure of cell 24 to air, thereby extending the life of the cell. As shown in FIG. 1, system 20 further includes a first valve plate 30 having one or more pressure-sensitive valves 33, an air mover 32, and a second valve plate 34 having one or more pressure-sensitive valves 35. Plates 30 and 34, and air mover 32 (for example, a fan) are used to regulate air flow into and out of housing 22. More specifically, plates 30 and 34 include one or more pressure-sensitive valves 33 and 35, respectively, that respond to a force (e.g., a blowing or a sucking force) generated by air mover 32. Valves 33 and 35 can open or close depending on whether air mover 32 is activated or deactivated, thereby adjusting air flow to cell 24.

For example, during use, air mover 32 is activated, e.g., using power from cell 24 and residual oxygen in housing 22. When activated, air mover 32 produces a pressure differential between the opposite sides of valves 33 and 35. In particular, air mover 32 sucks air through openings 28 and exerts a force against valve(s) 33 to open the valve(s). The air flows through valve(s) 33 and plenum 23 and contacts cell 24 for the cell's cathodic reaction so system 20 can provide power. Air mover 32 also blows against valve(s) 35 to open the valve(s) and blows air out of openings 29. The air mover-assisted convection of air can provide system 20 with relatively high rates, e.g., relative to diffusion of air. When system 20 is no longer in use, air mover 32 is deactivated. With no pressure differential applied to valves 33 and 35, the valves close to reduce or to stop air flow to cell 24, thereby reducing degradation of the cell, e.g., from carbonation. As a result, the activated life of cell 24 is increased. In embodiments in which air flow is completely restricted, the activated life is theoretically infinite.

Valve(s) 33 and valve(s) 35 can be the same type of valve (described below) or they can be different from each other. For convenience, only valve 33 will be described, but the description can apply to valve 35 as well. One general type of pressure-sensitive valve is formed from a thin, resilient membrane partially disposed on a support, e.g., valve plate 30. An opening, e.g., a slit, is formed in the membrane. The opening is capable of closing or opening as a function of the force exerted to the membrane or the pressure differential across the membrane.

Figure 2B:
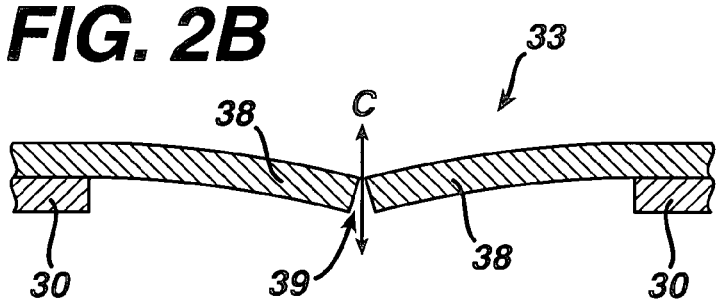

Referring to FIGS. 2A and 2B, in some embodiments, valve 33 includes a slit valve 36 formed on valve plate 30. Valve plate 30 can be made of, e.g., sufficient thick and/or stiff plastic or metal so as to be non-compliant. Slit valve 36 includes two movable wings or portions 38 made of a compliant material that can deflect together in a first direction (arrows A) or an opposite second direction (arrows B), depending on the direction of a force acting on the valve. In a rest position (FIG. 2A), e.g., when no or insufficient force is acting on valve 36, movable portions 38 close to form a seal 40. Seal 40 can be air tight to stop air from flowing through valve 36, or the seal can be formed to reduce air flow through the valve, for example, to allow a predetermined amount of air flow to sustain a level of standby power. For example, in the rest position, movable portions 38 can define a gap less than about 1% of the thickness (T) of valve 36. When a sufficiently strong force is exerted on valve 36 by air mover 32 (FIG. 2B), movable portions 38 deflect (arrows A or B) to form a gap 39 between the portions, and air can flow through valve 36 (arrow C). When the force is no longer sufficient to deflect portions 38, e.g., when air mover 32 is deactivated, the portions return to the rest position, thereby stopping or reducing air flow through valve 36.

Figure 3A:
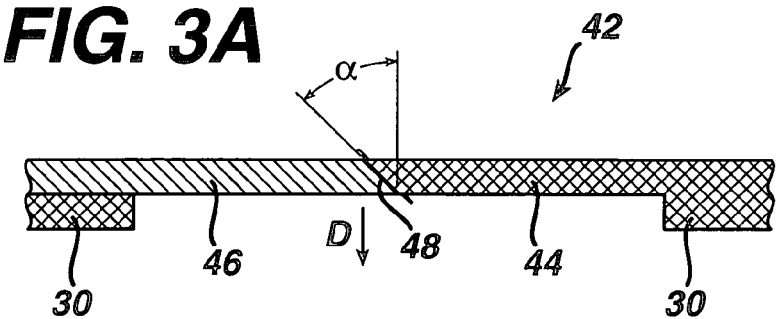
FIGS. 3A and 3B are illustrations of an embodiment of a slit flap valve in a closed position and an open position, respectively.
Figure 3B:
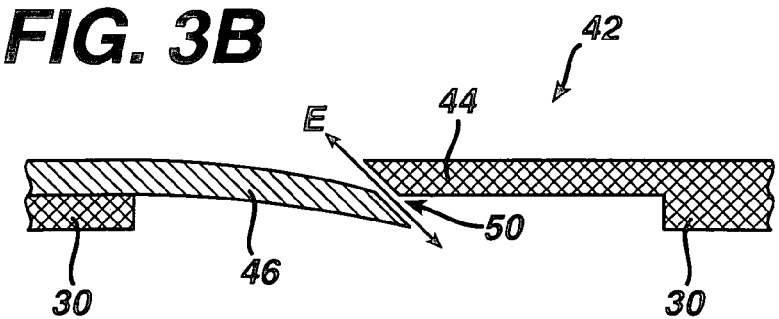

Referring to FIGS. 3A and 3B, in other embodiments, valve 33 includes a slit flap valve 42 formed on valve plate

30. Slit flap valve 42 includes a stationary portion 44 and a movable wing or portion 46 made of a compliant material that can deflect in one direction (arrow D). Stationary portion 44 can be formed by using a non-compliant material, such as a hard polymer or metal, and/or by reinforcing the stationary portion with a rigid support. As shown, stationary portions 44 can be integrally formed from valve plate 30. In a rest position (FIG. 3A), e.g., when no or insufficient force exerted on valve 42, stationary portion 44 and movable portion 46 form a seal 48, generally as described above for seal 40. In some embodiments, seal 48 is formed at an angle ($\alpha$) of about 30-75° relative to the axis perpendicular to the plane of valve 42. When a sufficient force is exerted on slit flap valve 42, movable portion 46 deflects (arrow D) to form a gap 50 between portions 44 and 46, and air can flow through valve 42 (arrow F). When the sufficient strong force is no longer exerted, movable portion 46 returns to its rest position, thereby stopping or reducing air flow through valve 42.

For a given force exerted (or pressure drop), slit flap valve 42 can provide a larger gap relative to slit valve 36. Only one wing portion is moved in slit flap valve 42, whereas two wings are moved in slit valve 36. Furthermore, gap 50 of slit flap valve 42 can increase linearly as a function of the pressure drop, but in some cases, the size of gap 39 of slit valve 36 momentarily decreases as the force exerted on valve 36 is increased. (The upstream "corners" of movable members 38 can momentarily reduce the size of gap 39 as the members are deflecting.) Slit flap valve 42 can also be relatively easier to manufacture than slit valve 36.

Figure 4A:
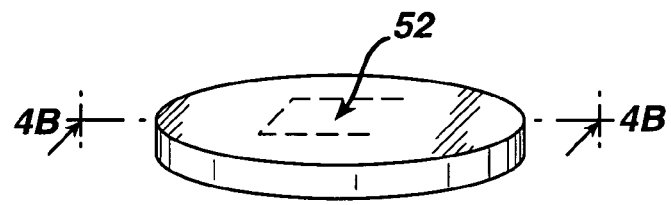
FIG. 4A is an illustration of an embodiment of a flap valve.
Figure 4B:
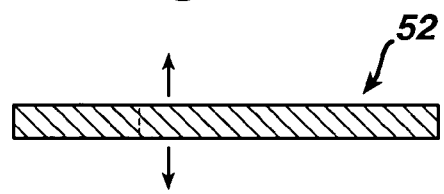
FIG. 4B is a cross-sectional view of the valve of FIG. 4A, taken along line 4B-4B.
Figure 4C:
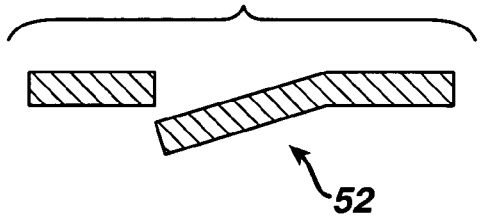
FIG. 4C is an illustration of the valve of FIG. 4A in an open position.

Still other embodiments of valves 33 are possible. In general, valve 33 can be any mechanism capable of adjusting air flow through the valve in response to a pressure differential or a force exerted on the valve. For example, referring to FIGS. 4A-4C, a flap valve 52, similar to dog door, can be formed by cutting an appropriate configuration in a compliant material. Flap valve 52 can then open (FIG. 4C) or close (FIG. 4B) as a function of force exerted. Other embodiments of valves 33, including methods of making them, are described in U.S. Ser. No. 10/655,499, filed Sep. 4, 2003, and entitled "Air Electrode Batteries", hereby incorporated by reference.

Valves 33 can be formed of any compliant material, preferably one that undergoes relatively low or no permanent deformation. In some embodiments, the material is relatively impermeable to gases, for example, oxygen and/or carbon dioxide cannot diffuse through the material. In some cases, however, the material may have a predetermined porosity to allow a predetermined amount of air to diffuse through the material, e.g., to maintain a standby rate. The material can be a polymer or a metal, e.g., a thin metal foil such as aluminum. Examples of materials include latex, rubber, polypropylene, or polyethylene. The thickness of the material can range from about 10 microns to about 250 microns. For example, the thickness can be greater than or equal to 10, 50, 100, 150, or 200 microns, and/or less than or equal to 250, 200, 150, 100, or 50 microns. For a given thickness, the stiffness of the material and the work required to open the valve depends on the Young's modulus of the material. In some embodiments, the material has a Young's modulus of about 1 MPa to about 10 MPa. For example, the material can have a Young's modulus greater than or equal to 1, 2, 3, 4, 5, 6, 7, 8, or 9 MPa, and/or less than or equal to 10, 9, 8, 7, 6, 5, 4, 3, or 2 MPa. Valves 33 can be formed by attaching a sheet of compliant material to valve plate, e.g., using an adhesive, and laser cutting portions of the sheet.

Figure 5A:
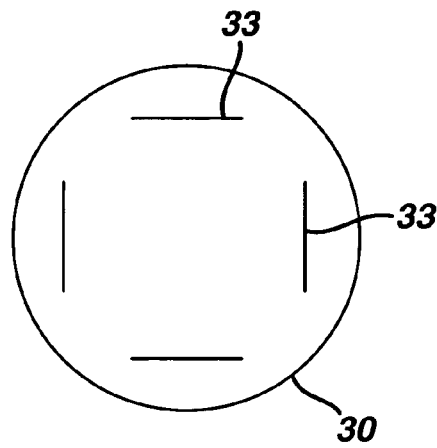
FIGS. 5A, 5B, and 5C are illustrations of embodiments of valve plates.
Figure 5B:
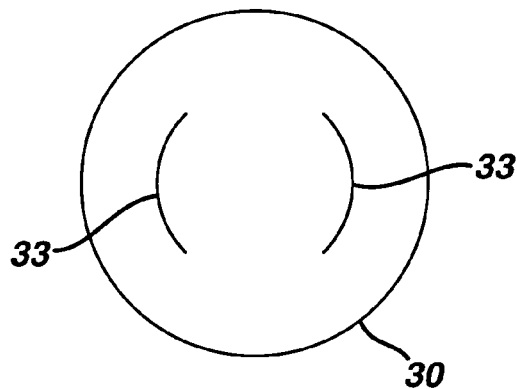
Figure 5C:
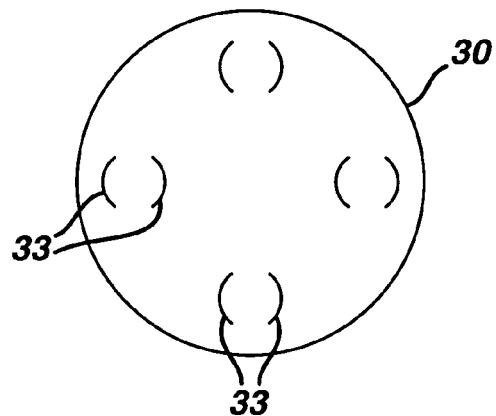

Numerous configurations can be used to place pressure-sensitive valves. FIGS. 5A-5C show some examples of configurations of valves 33 on a valve plate 30. Valve plate 30 can include one or more valves 33, e.g., two, three, four, five, six, seven, eight or more. Valves 33 can be generally linear (FIG. 5A) or curved (FIGS. 5B and 5C). Valves 33 can be arranged symmetrically or asymmetrically. Combinations of valves 33 can be used. For example, a valve plate may include one or more slit valves, one or more slit flap valves, one or more flap valves, and/or one or more of a different type of pressure-sensitive mechanism. System 20 can include a total of one or more valve plates, e.g., two, three, four, five, six, seven, eight or more.

Valves 33 can be placed anywhere in system 20 to regulate air flow. In some embodiments, housing 22 includes air access opening(s) on its side, and one or more valves 33 can extend across and cover the opening(s). Housing 22 may include louver(s), and valve(s) 33 can extend across and cover the louver(s). Louvers, including placement of the louvers, are described in U.S. Pat. No. 6,232,007, hereby incorporated by reference. Valve(s) 33 can be formed across openings 28 and/or 29, with or without valve plates 30 and/or 34.

Air mover 32 is configured to exert a force against valves 33 and 35, and to provide a preselected pressure drop and flow rate through plenum 23. Air mover 32 is interfaced with a control circuit (not shown). The control circuit is configured to control air mover 32 according to a preselected mode of operation. For example, in some embodiments, the control circuit can be designed to activate air mover 32 when the control circuit detects a certain voltage or current, e.g., a threshold current from the electronic device in which system 20 is used. When the detected voltage or current changes beyond a predetermined value, e.g., the threshold current, the control circuit can deactivate air mover 32. An example of a control circuit is described in U.S. Ser. No. 10/236,106, entitled "Electrochemical Cell Systems" and filed Sep. 6, 2002, hereby incorporated by reference in its entirety. Variable fan speed, e.g., for variable current requirements, can be used. For example, the control circuit may include an analog transistor rather than a resistor. An example of air mover 32 is one having a DC motor fan, available from Kot'l JinLong Machinery, Wenzhou, China PR.

Cell 24, including different embodiments of the cell, and a method of manufacturing the cell, is described in U.S. Ser. No. 10/236,106. Other methods of making cells are described, for example, in commonly-assigned U.S. Ser. No. 10/060,701, filed Jan. 30, 2002, hereby incorporated by reference in its entirety. Other metal-air cells and methods of making them are described in U.S. Ser. No. 09/374,277, filed Aug. 13, 1999; U.S. Ser. No. 09/374,278, filed Aug. 13, 1999; U.S. Ser. No.09/416,799, filed Oct. 13, 1999; U.S. Ser. No. 09/427,371, filed Oct. 26, 1999; and U.S. Ser. No. 09/494,586, filed Jan. 31, 2000, all hereby incorporated by reference in their entirety.

In embodiments, housing 22 can be, for example, made of a metal or a plastic, e.g., by molding or extrusion. In embodiments, housing 22 includes one or more openings on the side of the housing. The opening(s) allows air to enter housing 22 for cell 24 to sustain a standby current. The opening(s) also allows non-reactant gases, such as nitrogen, to exit housing 22. Alternatively or in addition, system 20 may include only one valve plate such that cell 24 is exposed to air via openings 28 or 29. Alternatively or in addition, valves 33 and/or 35 may not be air tight when in their rest position, as described above.

In one mode of operation, air is supplied to cells 24 when system 20, specifically, the control circuit, detects a predetermined threshold current demand from the device in which the system is used. When the control circuit detects the threshold current, the circuit activates air mover 32, e.g., using standby current produced from residual air, and/or from air flowing through valve 33, valve 35, and/or other openings. The force created by air mover 32 draws or sucks air through openings 28, deflects the movable members of valves 33 into the interior of housing 22, and opens valves 33. Air flows into the interior of housing 22 and contacts metal-air cell 24 for its cathodic reaction. Air also flows to valves 35 and deflects the movable members of valves 35 outwardly, thereby allowing air to exit housing 22 through valves 35 and openings 29.

Valves 33 and/or 35 can remain constantly open or partially open during the time that air mover 32 is activated. In some modes of operation, valves 33 and/or 35 cycle open and close (or partially open and partially closed) during operation, depending, for example, on the required current and/or the force exerted by air mover 32.

When the control circuit detects a current below the threshold current, e.g., when the device is turned off, the control circuit deactivates air mover 32. Air mover 32 stops sucking and blowing air through system 20, and the force exerted against valves 33 and 35 is reduced. As a result, valves 33 and 35 return to their rest position, thereby stopping and/or reducing air flow through system 20. Carbonation of cell 24 is reduced and the life of the cell is extended.

OTHER EMBODIMENTS

Figure 6:
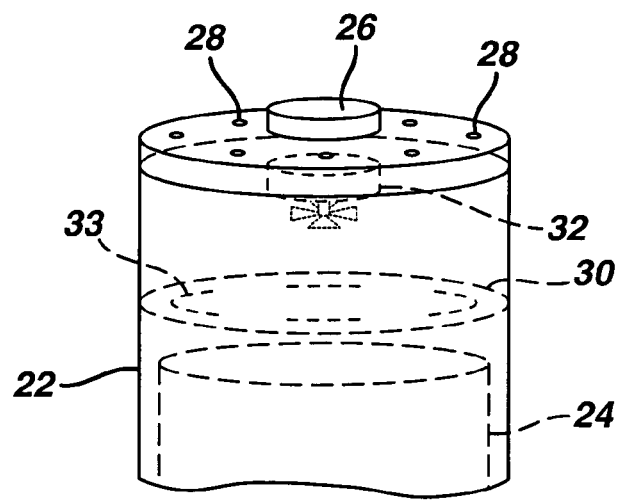
FIG. 6 is an illustration of a portion of an embodiment of an electrochemical cell system.

Referring to FIG. 6, in other embodiments, air mover 32 is upstream of first valve plate 30. When activated, air mover 32 exerts a force, e.g., blows, against valves 33 such that its movable member(s) deflect into housing 22.

Figure 17:
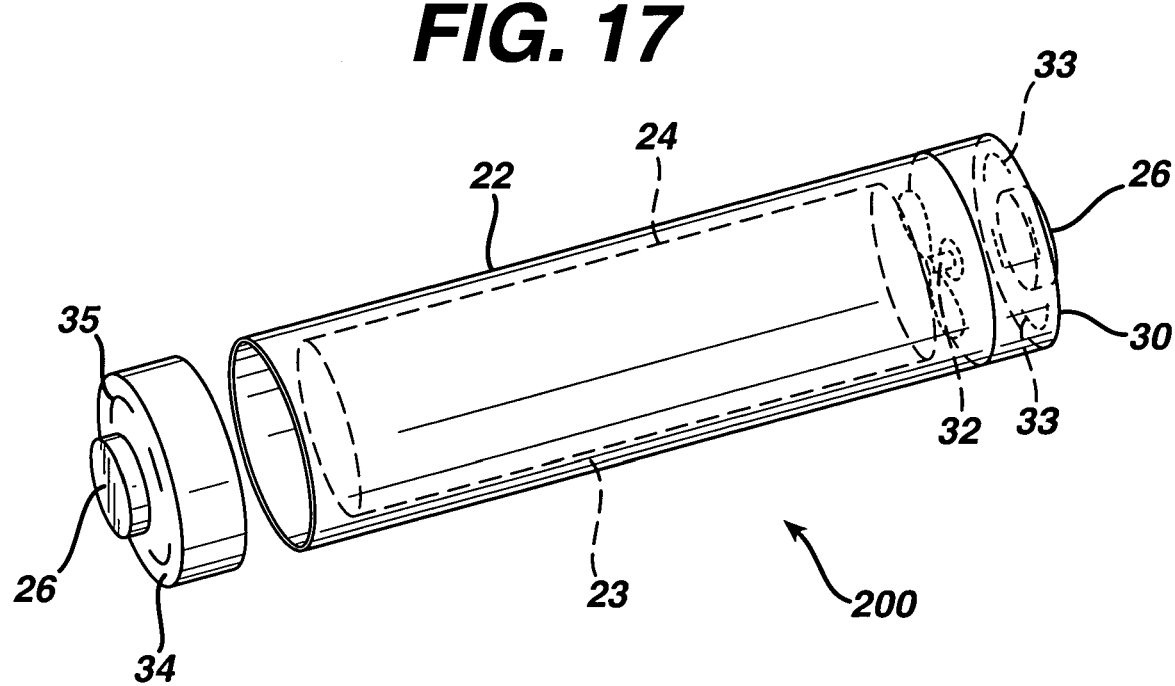
FIG. 17 is an illustration of an embodiment of an electrochemical cell system.

Referring to FIG. 17, in some cases, a cell system 200 includes valve plates 30 and 34 that form the ends of the system. As shown, valve plates 30 and 34 include terminals 26, and no additional openings, e.g., openings 28 and 29, are needed.

In some embodiments, system 20 can include more than one cell, e.g., two, three, four, five, six, seven, or eight or more. FIGS. 7 and 8 show a system 100 having a housing 22, two cells 24, an air mover 32, a control circuit 102, and a diffusion channel or tube 104. Pressure-sensitive valve(s) can be placed as described above. For example, the valve(s) can be placed across diffusion tube 104, adjacent to (e.g., upstream or downstream of) air mover 32, across air access opening(s) (not shown) in housing 22, and/or at the ends of the housing. FIG. 9 shows a system 106 having a housing 22, four cells 24, and diffusion channels 108. Valve(s) can be formed as described above. Systems 100 and 106 are described in detail in U.S. Ser. No. 10/236,106. Other cell systems having diffusion channels or tubes are described in U.S. Ser. No. 09/400,020, filed Sep. 21, 1999, and entitled "Air Manager System for Metal Air Battery," hereby incorporated by reference.

In other embodiments, other types of electrochemical cells, e.g., air-assisted cells, can be used. Air-assisted cells are described, for example, in U.S. Pat. No. 6,372,370, hereby incorporated by reference in its entirety. Other types of metal-air cells, such as magnesium-air cells or aluminum-air cells, can be used.

Other configurations for cell 24 are possible. For example, cell 24 can be prismatic. Housing 22 can also be prismatic. Examples of prismatic cells and housings are described in commonly assigned U.S. Ser. No. 10/060,701, entitled "Batteries and Battery Systems" and filed Jan. 30, 2002, hereby incorporated by reference in its entirety.

The valves and/or air movers described herein can be used in conventional metal-air batteries. For example, the valves can extend across air access opening(s) in the can of the metal-air battery. Metal-air batteries are described in U.S. Pat. No. 6,232,007.

In other embodiments, cell 24 includes a barrier layer (e.g., a PTFE layer) having one or more portions that are modified relative to another portion(s) of the barrier layer to adjust the rate of flow of materials, such as oxygen and water, through the barrier layer. For example, portion(s) of the barrier layer that are closer to an inlet(s) (e.g., valve 33) (i.e., shorter diffusion paths) may have higher transport resistance than other portion(s) of the barrier layer farther from the inlet(s) (i.e., longer diffusion paths) to enhance (e.g., maximize) uniform oxygen access and/or to enhance (e.g., minimize) water transport. Portion(s) of the barrier layer can have different mass transport resistance or permeability to selected material(s) than other portion(s) of the barrier layer. Portion(s) of the barrier layer can have different porosity than other portion(s) of the barrier layer. Portion(s) of the barrier layer can have different apparent density than other portion(s) of the barrier layer. In embodiments, one or more portions of the barrier layer are not uniform around the cells.

In embodiments, cell 24 includes a blotter layer that is wrapped around the exterior of the cathode, e.g., to absorb material such as electrolyte that may leak out the cell. The blotter layer can be, e.g., Whatman paper or Pelon (a nonwoven, uncalendered polyamide fabric (freudenberg Nonwovens Technical Products Division, Lowell, Mass.). The blotter layer can be modified similarly to the barrier layer, as described above.

Numerous methods can be used to modify, e.g., increase or decrease, properties of the barrier layer and/or blotter layer, such as the mass transport resistance of a material, e.g., water and/or oxygen, through the layer. In some embodiments, the barrier layer is mechanically worked. In other embodiments, the thickness of the barrier layer is modified. Other methods of modifying the barrier layer are described in U.S. Ser. No. 10/060,701 and U.S. Pat. No. 6,232,007.

The following examples are illustrative and not intended to be limiting.

EXAMPLE 1

The following example illustrates a method for designing an electrochemical cell system, here, having a AA cylindrical cell, an air mover, and one or more pressure-sensitive valves.

Figure 10:
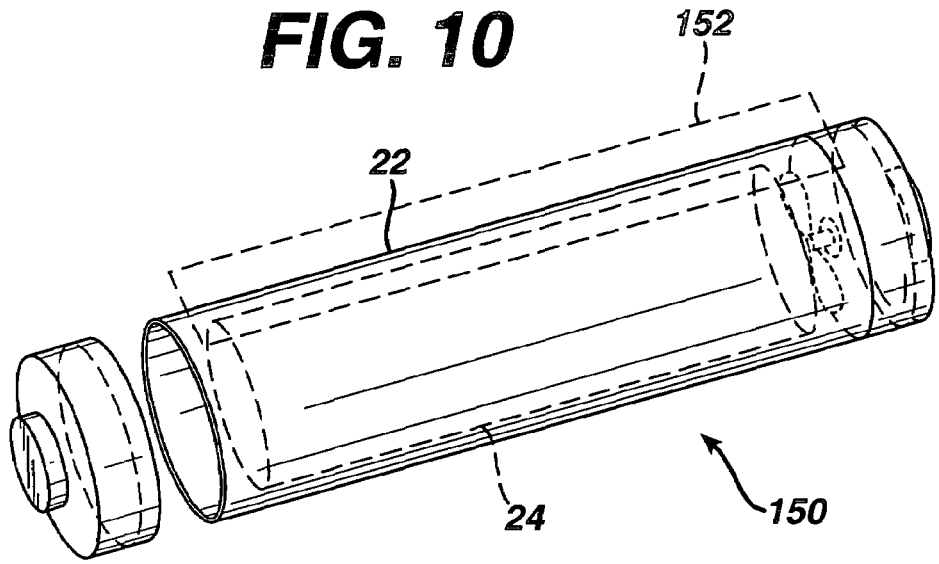
FIG. 10 is an illustration of an embodiment of an electrochemical cell system, showing a modeling geometry.
Figure 11:
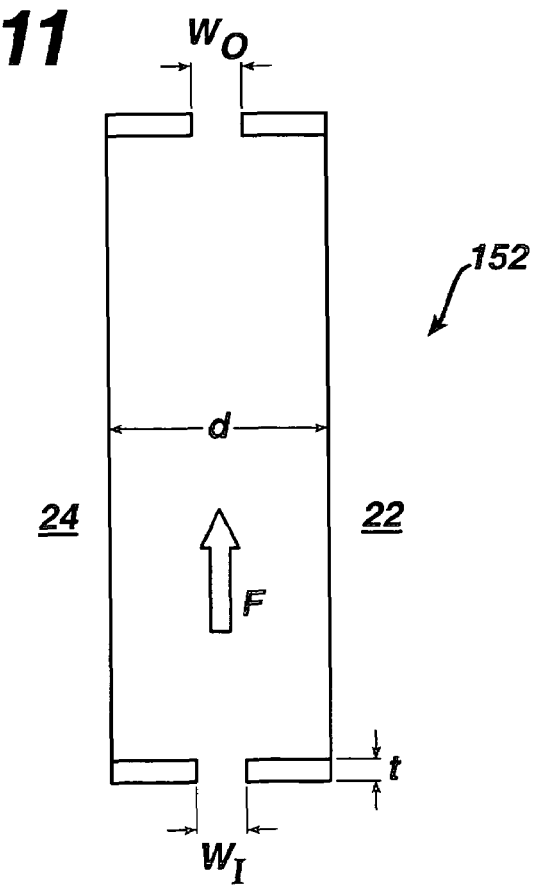
FIG. 11 is a schematic diagram of the modeling geometry of FIG. 10.

FIG. 10 shows a cell system 150 illustrated with a model geometry 152, schematically represented in FIG. 11. As shown, d is the plenum depth (cm); $W_I$ is the inlet valve opening width (cm); $W_O$ is the outlet valve opening (cm); t is the valve thickness (cm); and F is the flow rate (cc/s). The cell length used was 5.0 cm; and the cell diameter used was 1.4 cm. The valve as modeled was a slit valve having the configuration of FIG. 5B. The system was drawn in Femlab® (available from Comsol, Inc., Burlington, Mass.), the Navier Stokes equation was solved in the geometry from the inlet to the outlet. The maximum and minimum ranges for the design parameters were chosen as follows:

TABLE 1

|  | Minimum | Maximum |
| --- | --- | --- |
| Valve thickness (cm) | 0.003 | 0.03 |
| Valve opening width (cm) | 0.001 | 0.01 |
| Ratio outlet width/inlet width | 0.5 | 1 |
| Plenum depth (cm) | 0.05 | 0.15 |
| Flow rate (cc/s) | 0.1 | 1 |

The ratio of outlet width/inlet width is typically 1 and is lower when there are different conditions at the outlet and the inlet.

Using the above ranges, a design matrix was simulated using a Small Face-Centered Central Composite Design algorithm (available in StatEase Design Expert®). Pressure drops were solved for across the inlet, the outlet, and the plenum between the inlet and the outlet. The results were used to develop the following correlations:

$$dP_I = 1020 \frac{t^{0.649} F^{0.968}}{W_I^{2.67}} \quad (1)$$

$$dP_O = 889 \frac{t^{0.827} F}{W_O^{2.81}} \quad (2)$$

$$dP_{Pl} = 1130 \frac{F^{1.03}}{d^{3.27}} \quad (3)$$

$$dP_{System} = dP_I + dP_O + dP_{Pl} \quad (4)$$

$dP_I$ is the pressure drop across the inlet, $dP_O$ is the pressure drop across the outlet, $dP_{pl}$ is the pressure drop across the plenum, and $dP_{System}$ is the total pressure drop in the system. The correlations above were developed using a multi-variate regression algorithm on the responses obtained by the model.

Figure 12:
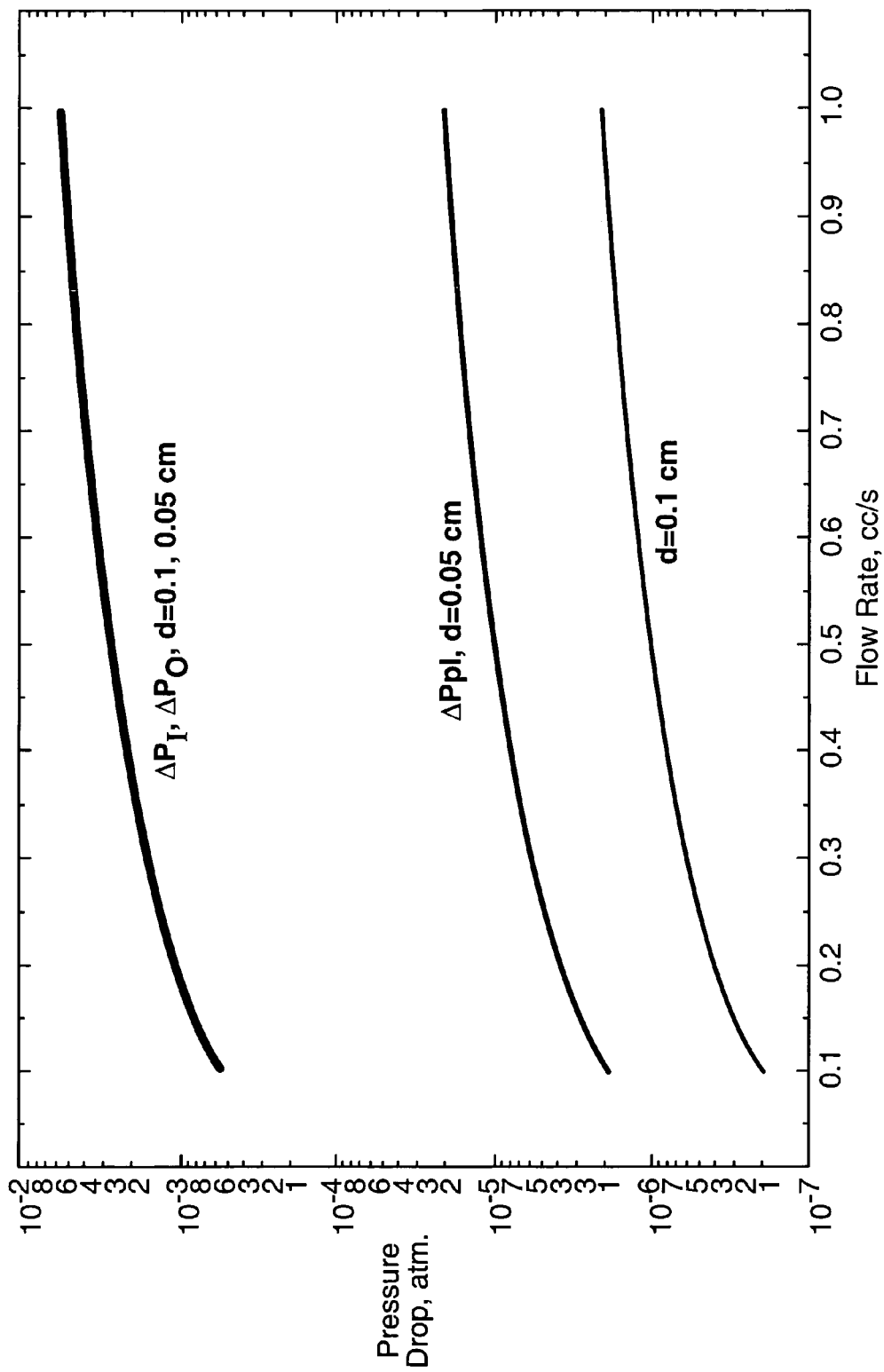
FIG. 12 is a plot of pressure drop (atm) vs. flow rate (cc/s).

FIG. 12 shows the effect of flow rate and plenum depth on the pressure drop. The valve widths are 10 microns, and the thickness of the valves is 100 microns. The pressure drop across the plenum is a function of the plenum depth and flow rate only. $dP_{pl}$ increases with an increase in the flow rate and decreases with an increase in the plenum depth.

Figure 13:
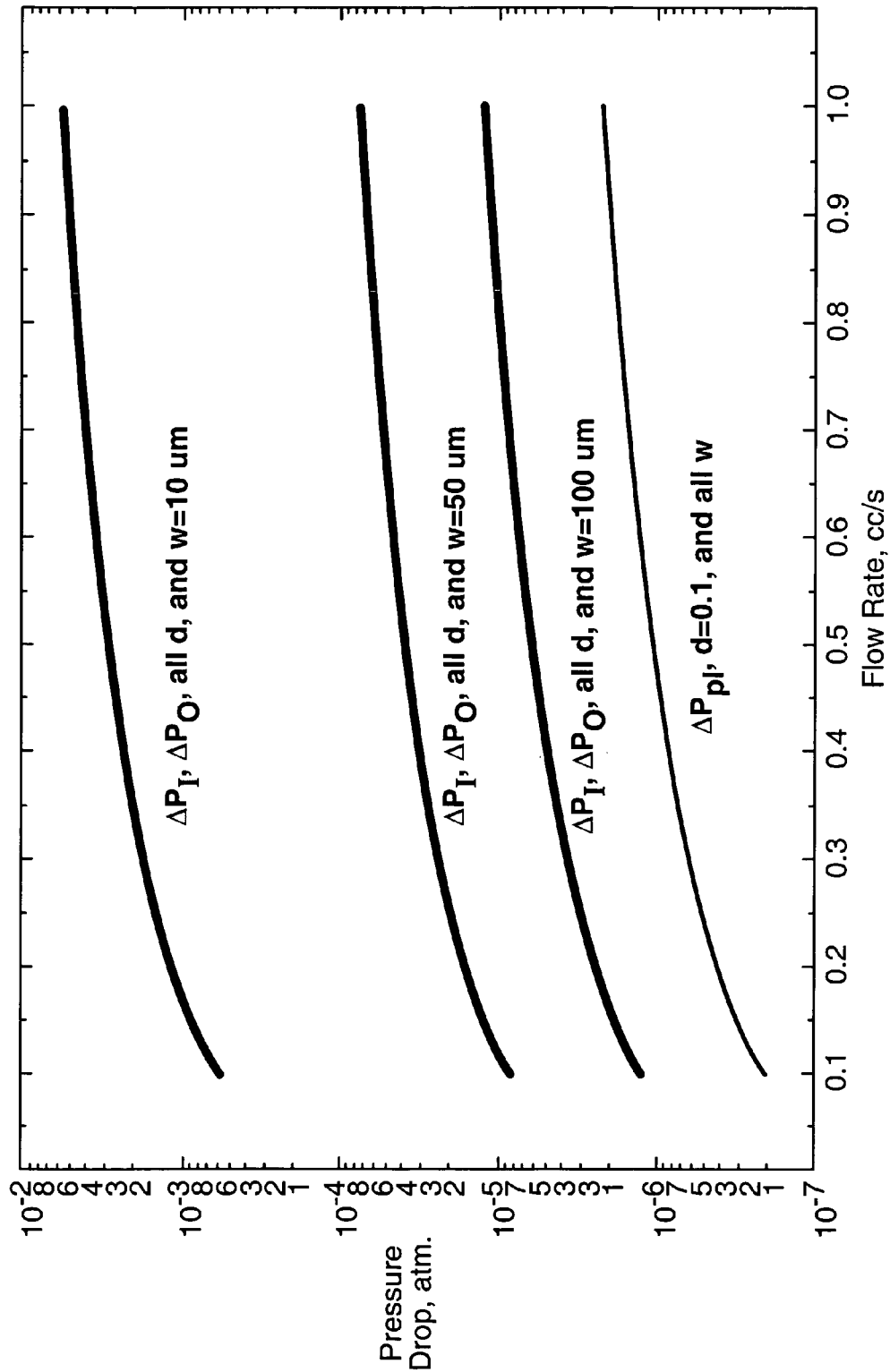
FIG. 13 is a plot of pressure drop (atm) vs. flow rate (cc/s).

FIG. 13 shows the effect of flow rate and valve opening width on the pressure drop for identical valves across the inlet and the outlet. The thickness of the valves is 100 microns. The pressure drop across the inlet or the outlet is a function of the valve opening width, valve thickness, and flow rate only. $dP_I$ or $dP_O$ increases with an increase in the flow rate, and decreases with an increase in the opening width.

Figure 14:
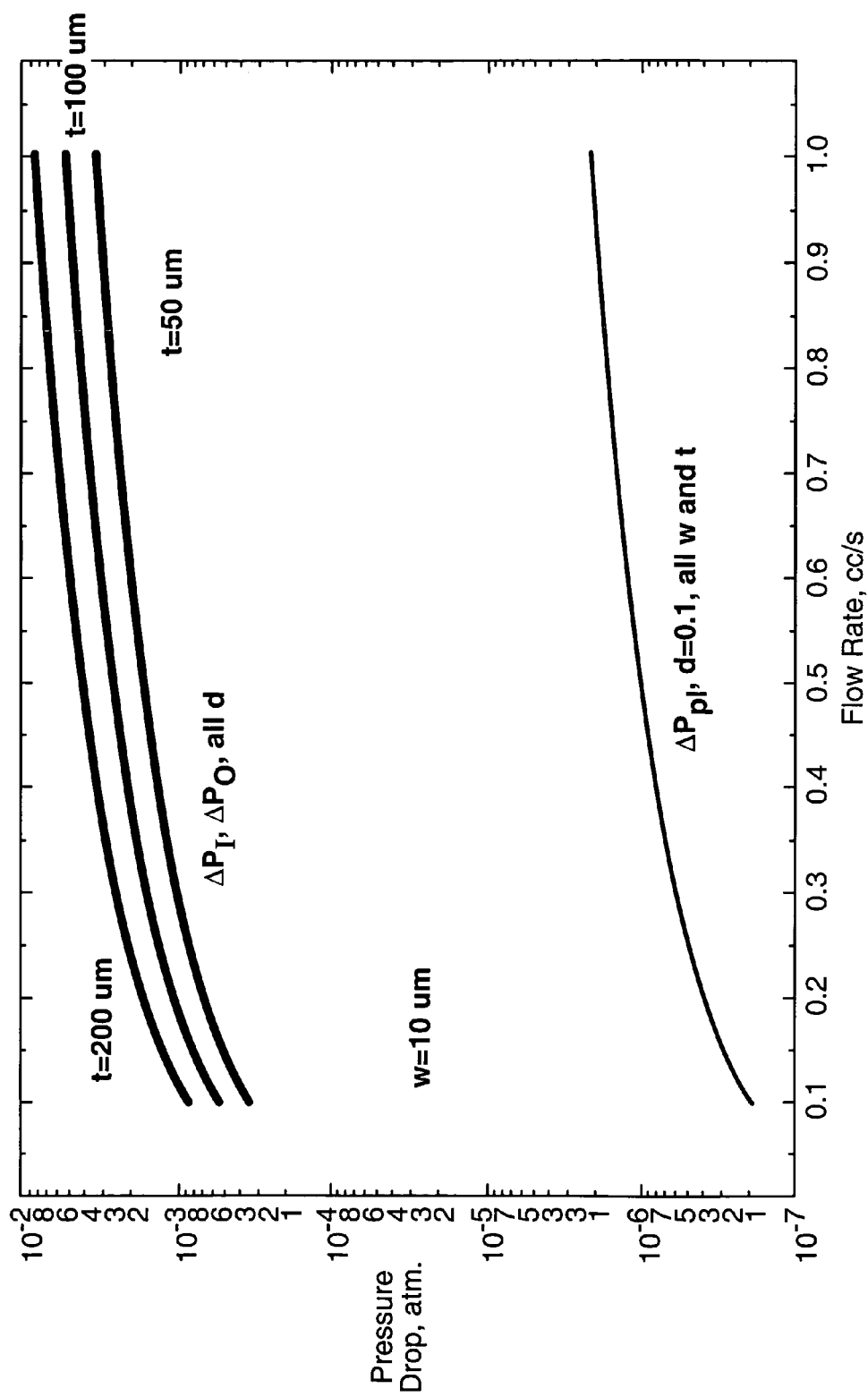
FIG. 14 is a plot of pressure drop (atm) vs. flow rate (cc/s).

FIG. 14 shows the effect of flow rate and valve opening thickness on pressure drop for identical valves across the inlet and the outlet. The width of the valve openings is 10 microns. The pressure drop across the inlet or the outlet is a function of the valve opening width, the valve thickness, and the flow rate. $dP_I$ or $dP_O$ increases with an increase in the flow rate, and decreases with a decrease in the opening width.

Using the observations above, the following steps can be used to design parameters for the air mover and the slit valve. Generally, a flow rate is chosen based on an expected current. Then, for a chosen flow rate, plot the relationship between valve thickness, opening width, and pressure drop using equations 1-4. Choose a valve thickness, and plot the opening width vs. the pressure drop from equations 1-4. Plot the opening width vs. pressure drop for various valve materials and find their intersection with the preceding plot. The system pressure drop should be twice the valve pressure drop. Select an air mover that can provide the appropriate pressure drop and flow rate.

More particularly, first determine the minimum mean partial pressure of oxygen ($p_{O2}$) required to sustain an applied current density, I (mA/cm$^2$). The % $O_2$=100+54.17−27.69*ln(I). Determine the cell current that the system will typically encounter, e.g., $I_{cell}$=0.5 A. Choose a flow rate of air (F) that the system needs:

$$F = \xi \frac{I_{cell} RT}{nFp_{O_2}[1 - \% O_2/100]} \quad (5)$$

where F (Faraday's constant)=96,487 C/equiv.; N (total number of electrons)=2.5; R (gas constant)=82.06 atm-cc/mol-K; ξ (stoichiometric factor)~1.0-4.0 for currents>0.5 A; and $p_{O2}$ (ambient)=0.21 atm. Fix d, e.g., 0.5-1.5 mm.

Figure 15:
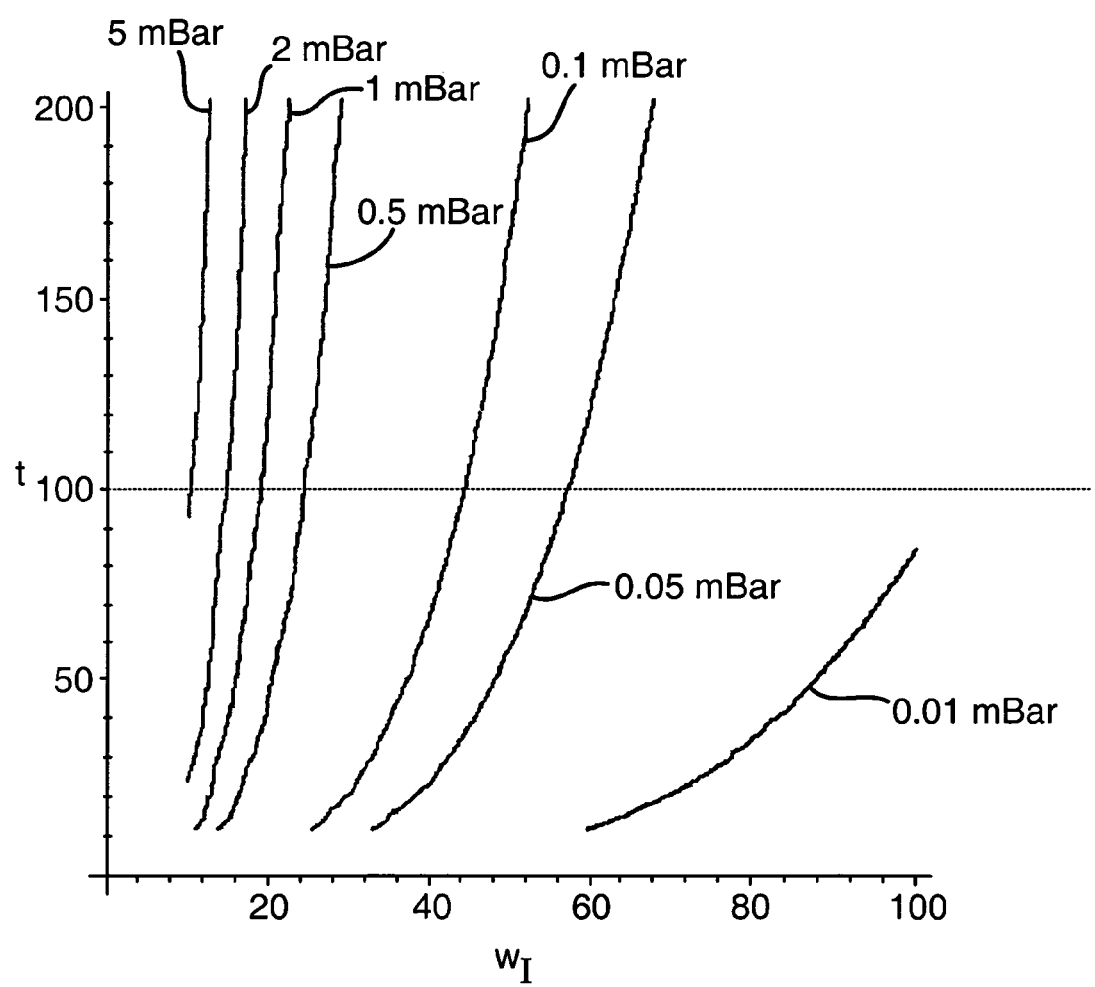
FIG. 15 is a plot of valve thickness (microns) vs. valve opening width (microns).

For chosen design parameters, establish the pressure drop conditions at the inlet and the outlet (FIG. 15). The calculations shown are for $I_{cell}$=0.5 A and d=1.0 m (in FIG. 15, t and $W_I$ are in microns rather than cm). Select a practical valve thickness, e.g., 100 microns.

Figure 16:
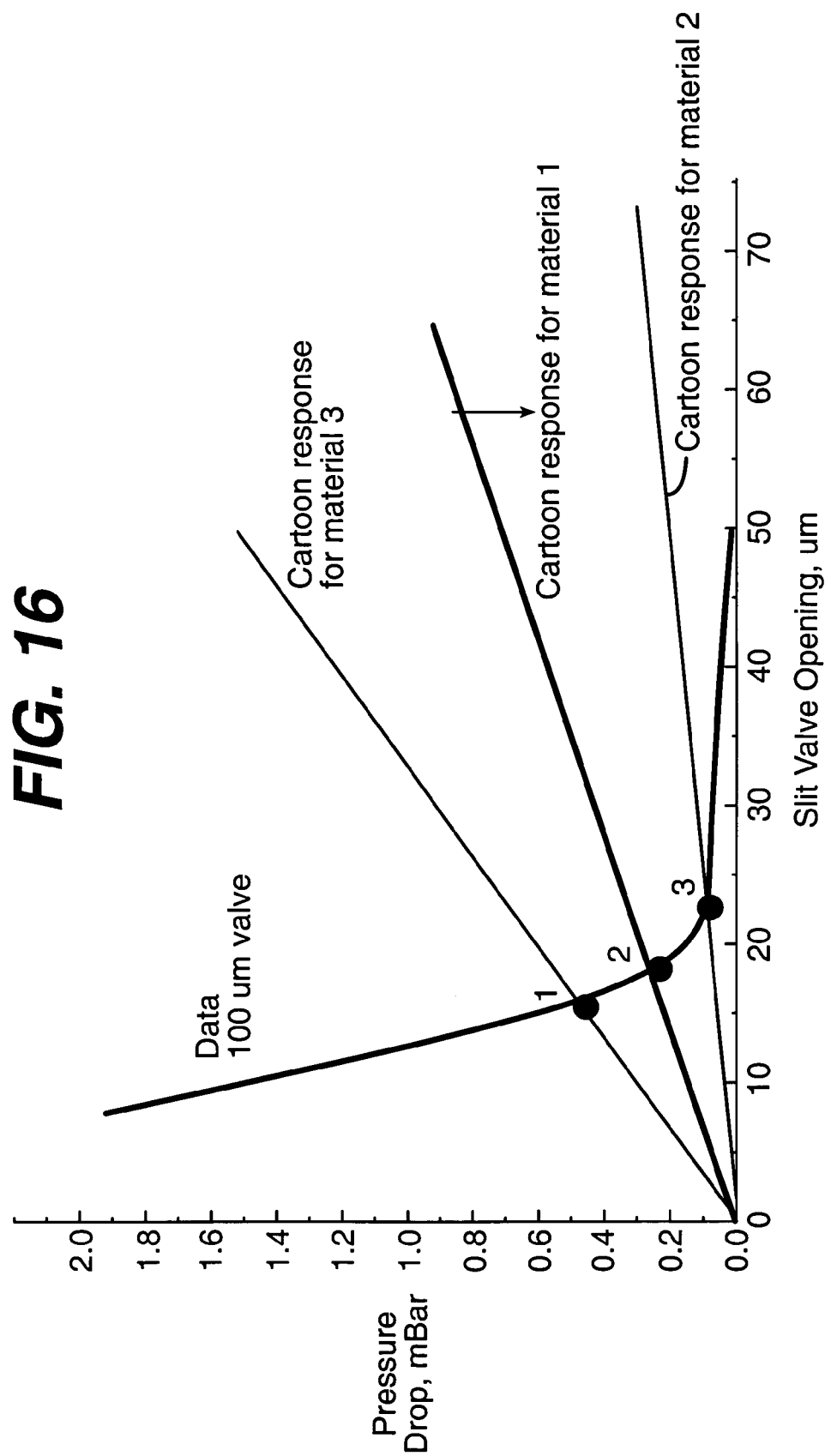
FIG. 16 is a plot of pressure drop (mbar) vs. valve opening (microns).

The inlet/outlet pressure drops and $W_I$'s are shown in FIG. 16. The pressure drop required to maintain the flow rate decreases with an increase in the valve opening width, according to equations 1-2. However, the pressure drop required to keep a particular membrane open increases with an increase in opening width. These two curves determine the inlet or outlet pressure drop by their point of intersection. Thus, the design of the slit valve determines the pressure drop, because different slit valves yield different intersection points (as illustrated in FIG. 16). The response curves for the slit valves depend on the valve plate design and the Young's modulus of the material of the valve. For a more rigorous method of material selection, the response curves can be generated using a FEA software (e.g., ANSYS) for different designs and materials.

An air mover is then selected that can provide the appropriate pressure drop and flow rate. The system pressure drop, which the air mover provides, is given by equation 4. The air mover and slit valves should be chosen together, because of the relation in equation 4 between inlet or outlet width pressure drop (determined by the slit valve, as described above) and the system pressure drop (which is provided by the air mover). A less responsive slit valve typically requires a more powerful air mover that can provide a greater pressure drop, thereby opening the valve wide enough to maintain the flow rate. A less powerful air mover typically requires a more responsive slit valve to open wide enough to maintain the flow rate.

EXAMPLE 2

In a cylindrical system in which air enters from one end and reacts at the surface of a cell that is located axially, a gradient in the oxygen partial pressure in the axial direction exists. This gradient is a result of the resistance for the transport of oxygen. This transport resistance is inversely proportional to the area of the plenum and porosity of the barrier layers on the cell (e.g., Whatman paper or Teflon barriers), and is directly proportional to the length of the plenum and the thickness of the barrier layers. At a given current density, the oxygen partial pressure is a maximum at a gas entrance and a minimum at a gas exit. The partial pressure gradient in the axial direction is also a function of the applied current density the system is to support. A consequence of the oxygen partial pressure gradient is a gradient in the cathode current density. The reaction current density in the cathode is directly proportional to the concentration (or equivalently partial pressure) of oxygen. A variable reaction current in the axial direction affects the zinc utilization adversely. With time, the portion of the cell closer to the entrance becomes relatively more devoid of useful zinc, and progressively less zinc is available to support the applied current. Eventually, the zinc potential dives prematurely below the cutoff voltage and the device running on the battery shuts off.

To remedy (e.g., to make uniform) the axial oxygen and the resulting current density gradient, the resistance to the transport of oxygen to the surface of the cathode can be varied. The transport resistance can be manipulated by axially varying the thickness and/or porosity of the barriers on the cathode (i.e., Whatman paper or Teflon) or the plenum depth.

A general example is presented here. For example, for a certain applied current density, the oxygen gradient in the axial direction for a system in which air enters on one end and leaves the other can be calculated by generating simulations (using FEMLAB® software) given by data set 1 in FIG. 18. One goal then is to increase (e.g., maximize) zinc utilization by reducing (e.g., minimizing) the variation of the oxygen partial pressure. This can be accomplished by varying the thickness of the barrier layer and/or the porosity of the barrier layer. In practice, the variation of the plenum depth is similar but opposite to the barrier thickness and will not be addressed here.

For a given geometry and applied current density, the oxygen gradient normal to the cathode surface in the barrier layer and as a function of the axial coordinate can be represented by Fick's First Law. Fick's first law states that the current density, j, as a function of the axial coordinate, z, at any point on the cathode is related to the gradient in the oxygen concentration in the direction normal to the surface of the cathode, y. The relationship can be represented as:

$$\frac{\Delta u}{\Delta y}(z) = -\frac{V_n j(z)}{nFXD\varepsilon^{1.5}}$$

In the above equation, u is the oxygen concentration as a fraction of ambient oxygen, y is the coordinate normal to surface, z, the axial coordinate, $V_n$ is molar volume of air, X is ambient oxygen mole fraction, D is ambient diffusion coefficient, and $\varepsilon$ is membrane porosity. One objective is to maximize the utilization of the anode metal by making j(z) uniform. To make j(z) not vary in the z direction, $\Delta u$ is preferably made uniform as a function of z. As seen from the equation given above, this is possible by making y in the denominator of the left hand side increase proportionally and linearly with respect to the calculated gradient or render $\varepsilon^{1.5}$ in the denominator of the right hand side decrease proportionally.

Figure 18:
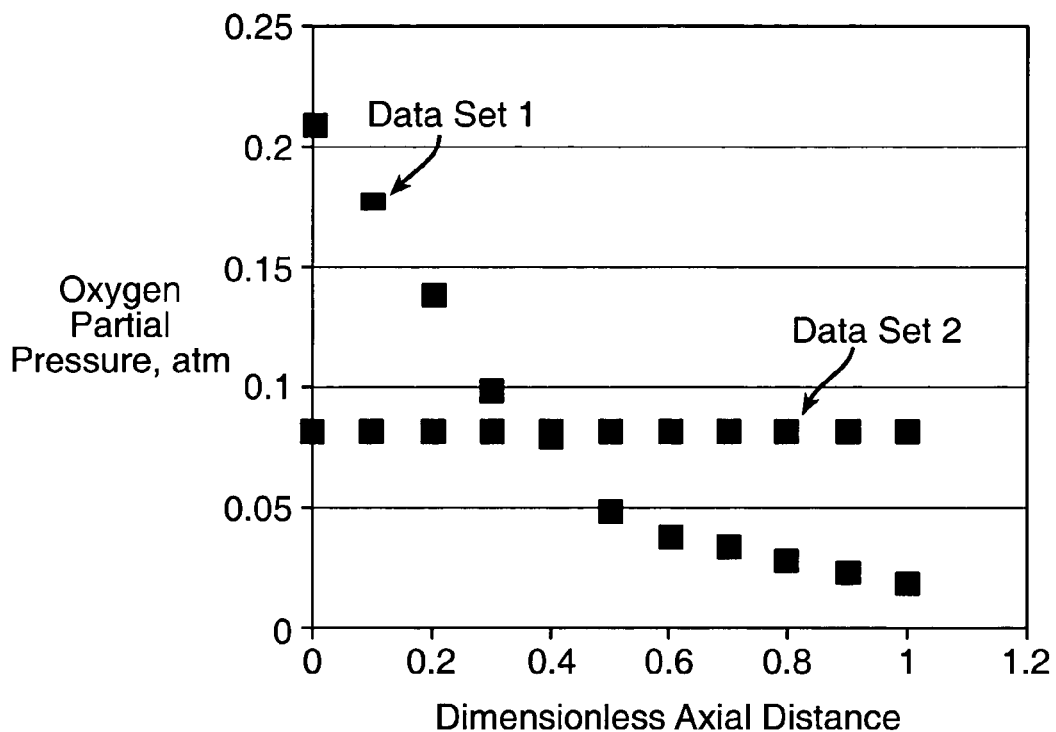
FIG. 18 is a plot of oxygen partial pressure vs. axial distance.
Figure 19:
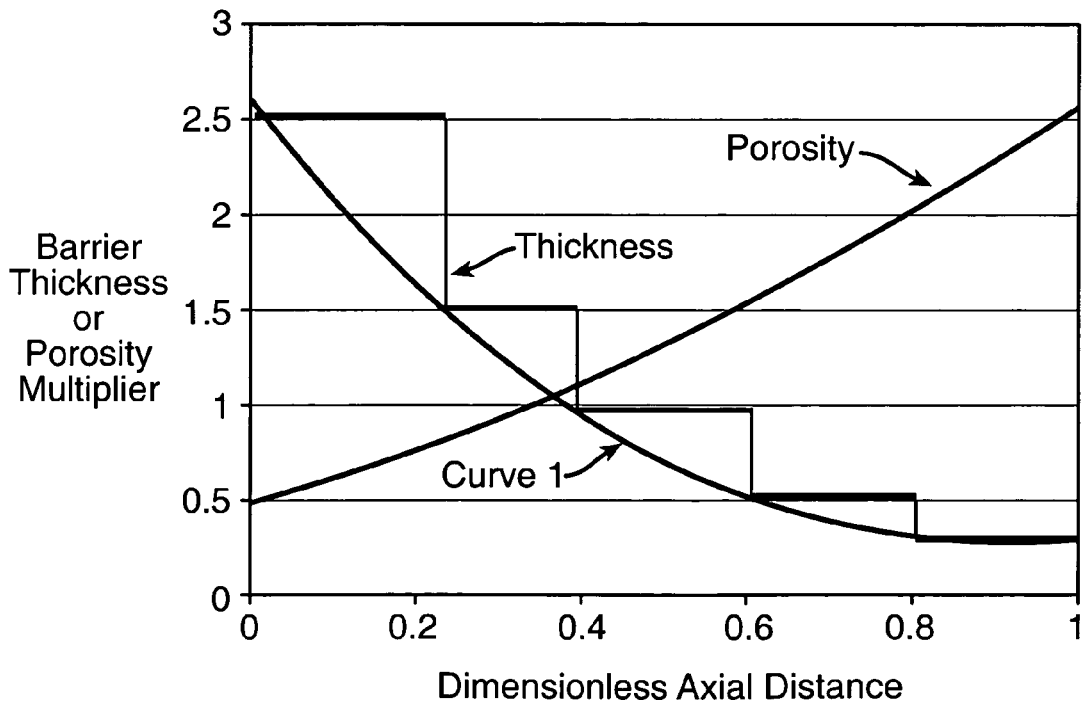
FIG. 19 is a plot of barrier thickness or porosity multiplier vs. axial distance.

The corresponding barrier thickness function and barrier porosity function that can make the partial pressure gradient presented in FIG. 18 (data set 1) uniform are shown in FIG. 19. The functionality of the thickness barrier variation was calculated by fitting a function to data set 1 and obtaining an average by integration. This average value of concentration was then used to divide the function fit for data set 1 to obtain the thickness multiplier as shown in FIG. 19. The thickness that was used in the original simulations that produced data set 1 is now multiplied by the function for the thickness. If the resulting variable thickness barrier is used in the system it can result in an average oxygen partial pressure as shown in data set 2 in FIG. 18. Using the average value and raising the resulting functionality to a power of 0.667 gave the porosity functionality. Multiplying the original porosity that was used in the generation of data set 1 when multiplied by the barrier porosity multiplier can also generate data set 2. The uniform partial pressure that can be obtained (see data set 2) can result in superior anode utilization.

In general it is preferable to use continuous films of variable thickness or porosity.

However, if it is economically infeasible to produce barrier layers with such continuous properties, it is preferred that step functional barriers be used. As an example, the step lines for the thickness barriers if used instead of the original uniform thickness can produce good anode utilization. The step functional barrier thicknesses can be less expensive to produce. One way to practice the step functions is by choosing a single barrier layer with thickness of 0.25δ where δ is the original thickness. Then to obtain 2.5, 1.5, 1 and 0.5 X, one can wrap 10, 6, 4 and 2 layers, respectively.

All publications and patents mentioned in this application are herein incorporated by reference to the same extent as if each individual publication or patent was specifically and individually indicated to be incorporated by reference.

Other embodiments are within the claims.

What is claimed is:

1. An electrochemical cell system, comprising:
   a housing having a first end including an air access opening and a second end having an air access opening;
   a metal-air cell in the housing;
   a plenum between the housing and the metal air cell that allows air to flow from the first end of the housing to the second end of the housing;
   fan in fluid communication with the metal-air cell and positioned near the first end of the housing;
   a first pressure-sensitive valve, positioned near the first end of the housing and the fan, in fluid communication with and responsive to the fan; and
   a second pressure sensitive valve, positioned near the second end of the housing, in fluid communication with and responsive to the fan,
   wherein the first valve, the second valve, and the fan are capable of regulating air flow to the metal air cell, and
   wherein when the fan is activated air is drawn into the system through the air access opening in the first end of the housing, then passes through the first valve, then passes through the plenum and contacts the metal-air cell, then passes through the second valve, and then passes through the air access opening in the second end of the housing and out of the system.

2. The system of claim 1, wherein the valve comprises a movable portion capable of moving in a first direction and a second direction opposite to the first direction.

3. The system of claim 1, wherein the valve comprises a movable portion capable of moving in only one direction.

4. The system of claim 1, wherein the first valve and the second valve are impermeable to water and carbon dioxide.

5. The system of claim 1, wherein the first valve comprises a metal.

6. The system of claim 1, wherein the fan is upstream of the first valve along an air flow path into the housing.

7. The system of claim 1, wherein the fan is downstream of the first valve along an air flow path into the housing.

8. The system of claim 1, wherein the housing comprises an elongate, hollow structure extending along the housing and the metal-air cell is within the elongate hollow structure.

9. The system of claim 1, comprising a plurality of metal-air cells in the housing.

10. The system of claim 1, wherein the housing is cylindrical.

11. The system of claim 1, wherein the housing is prismatic.

12. The system of claim 1, wherein the metal-air cell comprises a material having a gas permeability across a first portion of the material that is different than gas permeability across a second portion of the material.

13. The system of claim 1, wherein the first pressure-sensitive valve comprises a stationary portion and a movable portion responsive to the air mover, the movable portion capable of moving relative to the stationary portion to define a variable gap between the portions.

14. A metal-air cell having a first end and a second end and further, comprising:
- a cathode;
- fan in fluid communication with the cathode and positioned near the first end of the metal-air cell; and
- a first pressure-sensitive valve, positioned near the first end of the metal-air cell and in fluid communication with and responsive to the fan; and
- a second pressure sensitive valve positioned near the second end of the metal-air cell in fluid communication with and responsive to the fan, wherein the first valve, the second valve, and the fan are capable of regulating air flow to the metal-air cell, and wherein when the fan is activated air is drawn through the first valve and into the metal-air cell to contact the cathode, and then passes out of the metal-air cell and through the second valve.

15. The cell of claim 14 wherein the first valve comprises a movable portion capable of opening in only one direction.

16. The cell of claim 14, wherein the first valve and the second valve are impermeable to water and carbon dioxide.

17. The cell of claim 14, wherein the first valve comprises a metal.

18. The cell of claim 14, wherein the fan is upstream of the first valve along an air flow path to the cathode.

19. The cell of claim 14, wherein the fan is downstream of the first valve along an air flow path to the cathode.

20. The cell of claim 14, further comprising a housing, wherein the cathode, the fan, and the second valve are in the housing.

21. The cell of claim 14, wherein the first pressure-sensitive valve comprises a stationary portion and a movable portion responsive to the air mover, the movable portion capable of moving relative to the stationary portion to define a variable gap between the portions.

* * * * *